United States Patent [19]

Frey

[11] Patent Number: 4,880,530

[45] Date of Patent: Nov. 14, 1989

[54] SELF-CLEANING SCREENING DEVICE

[76] Inventor: Robert E. Frey, 2 Highland Ave., Chatham, N.J. 07928

[21] Appl. No.: 214,765

[22] Filed: Jul. 5, 1988

Related U.S. Application Data

[63] Continuation-in-part of Ser. No. 129,230, Dec. 7, 1987, abandoned.

[51] Int. Cl.$^4$ ............................................. B07B 1/55
[52] U.S. Cl. .................................. 209/380; 209/240; 209/250; 209/281; 209/392; 209/507
[58] Field of Search ............... 209/380, 240, 250, 257, 209/261, 262, 392, 251, 274, 281, 507, 366; 55/302, 97, 96, 381

[56]           References Cited
           U.S. PATENT DOCUMENTS

| | | | |
|---|---|---|---|
| 1,229,542 | 6/1917 | Steward et al. | 209/257 |
| 3,011,639 | 12/1961 | Holman | 209/274 |
| 3,816,176 | 6/1974 | Rundgvist | 209/380 |
| 4,174,276 | 11/1979 | Otness | 209/250 |
| 4,217,117 | 8/1980 | Syverson | 55/304 |
| 4,218,227 | 8/1980 | Frey | 55/302 |
| 4,282,090 | 8/1981 | Hoernschemeyer et al. | 204/380 |
| 4,419,234 | 12/1983 | Miller et al. | 210/232 |
| 4,464,263 | 8/1984 | Brownell | 210/484 |
| 4,486,205 | 12/1984 | Nishiyama | 55/302 |
| 4,521,231 | 6/1985 | Shilling | 55/302 |
| 4,610,704 | 9/1986 | Richard | 55/302 |

FOREIGN PATENT DOCUMENTS 1053472  3/1959  Fed. Rep. of Germany ...... 209/250

OTHER PUBLICATIONS

"Sweco Turbo-Screen ® classifiers", Bulletin TS861R G 2M, Sweco, Inc., Florence, Kentucky, Oct. 1986.
"Sweco Full-Flow", Bulletin FF871 AP15 986, Sweco Inc., Florence, Kentucky.
"Pulse Jet Screen Separator—The simple Answer to Difficult Screening Jobs", Brochure, Robert Frey Assocs., Chatham, New Jersey.

Primary Examiner—Andres Kashnikow
Assistant Examiner—Mark T. Le
Attorney, Agent, or Firm—Mathews, Woodbridge, Goebel, Pugh and Collins

[57]               ABSTRACT

The invention comprises a screening device for separating fine particles from a stream of air and a particulate mixture containing coarse and fines which includes a box-like hollow housing tilted downwardly at an acute angle. The housing contains a plurality of elongated screening elements and an air cleaning device consisting of a blowpipe and a series of nozzles directed at the screening elements through Venturi tubes. At periodic intervals a jet or pulse of air is injected into the Venturi tubes to reverse air flow and rid the screen elements of adhered coarse particles. Substantially complete fines removal can be achieved by employing a recycling loop between the coarse particle outlet and inlet of the housing.

18 Claims, 5 Drawing Sheets

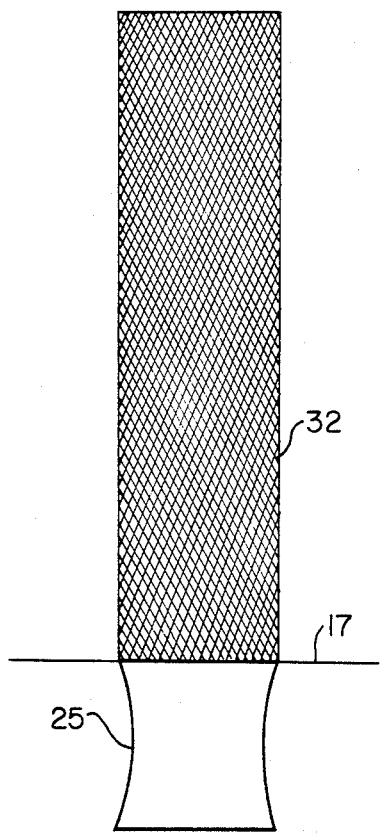
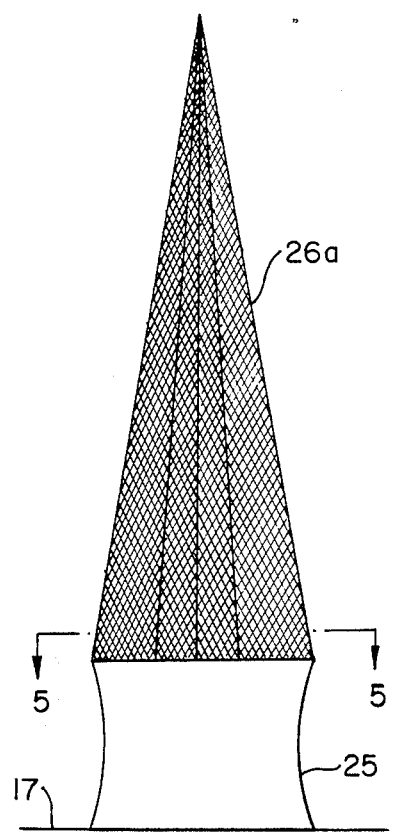
FIG. 3  FIG. 4
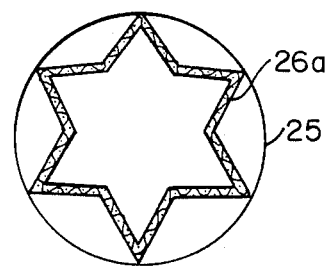
FIG. 5

SELF-CLEANING SCREENING DEVICE

This is a continuation-in-part of Ser. No. 129,230, filed Dec. 7, 1987 now abandoned.

BACKGROUND OF THE INVENTION

This invention is concerned with a screening device for separating fines from coarse particles in a particulate mixture containing a self-cleaning feature which enables the user to make separations at fine mesh.

In the past, screening devices for separating fine particles from a particulate mixture employed gravity to pull the fine material through the screen while using a vibratory motion to move the particulate mixture along the screen. Although these devices are generally satisfactory when relatively coarse particles are to be separated and large mesh size screens are employed, they are however, unsatisfactory when fine particles are to be separated because the coarse particles clog the screen and are not removed by the vibratory motion.

The aforementioned systems have been improved by providing an airflow to pull particulate material through the screen combined with a reverse airflow applied through a rotating or moving nozzle to continuously clean a portion of the screen area. The airflow removes or lifts material which would otherwise cover or blind the screen.

The present invention represents a marked improvement over airflow screening devices which invention employs special screening elements and jets or pulses of air injected through Venturi tubes to provide a combination of reverse airflow and shock-induced vibration to clean the screening elements.

SUMMARY OF THE INVENTION

In brief, the invention comprises a separator for separating coarse and fine particles from a particulate mixture containing them which comprises a box-like hollow housing tilted downwardly at an acute angle containing a tubesheet which separates the housing into an upper pre-screen chamber and a lower fines outlet chamber. A plurality of Venturi tubes are located in rows on the tubesheet and extend into the pre-screen chamber, each having mounted thereon an elongated screen element of conical, frustro-conical or cylindrical shape. An inlet for introducing air and particulate material to be separated into the pre-screen chamber is located at the top of the housing. A coarse particle outlet is located at the bottom of the housing on the side of the housing opposite of the inlet and also communicates with the pre-screen chamber. A fines outlet is also mounted at the bottom of the housing and communicates with the fines outlet chamber. A series of blowpipes having compressed air valves mounted therein is located in the fines outlet chamber and is connected with a manifold which in turn is connected to a source of compressed air. The blowpipes lie under a row of Venturi tubes and have nozzles which direct compressed air upwardly into the Venturi tubes. Particulate material and air are introduced into the inlet and contact the screen elements. Fines and air pass through the screens into the fines outlet chamber and out the fines outlet while coarse particles fall by gravity into the coarse outlet. In the course of separation, coarse particles build up on the screen and prevent fine passage. To remove the coarse particles, a pulse or jet of air from the blowpipe is periodically forced upwardly into the Venturi tubes to halt the flow of air and material and to clean the screens. Such pulsing can be sequenced to clean all rows of screen elements during operation.

In a separate embodiment, the housing may be of cylindrical shape with the screen element arranged in circular lines. The inlet for air and particulate material is located tangentially to the housing and the air/material mixture flows in a downward spiral pattern. By centrifugal force, some coarse particles are impelled away from the screen area.

In another embodiment, substantially complete fines removal can be achieved by recirculating coarse particles containing entrained fines from the coarse outlet back to the inlet on a batch basis.

BRIEF DESCRIPTION OF THE DRAWINGS

FIG. 3 is a side view of a cylindrical screen element useful in the device;

FIG. 4 is a side view of a pleated conical screen element useful in the device;

FIG. 5 is a sectional view of the pleated conical screen element through line 5—5 of FIG. 4;

DETAILED DESCRIPTION OF THE PREFERRED EMBODIMENTS

Figure 1:
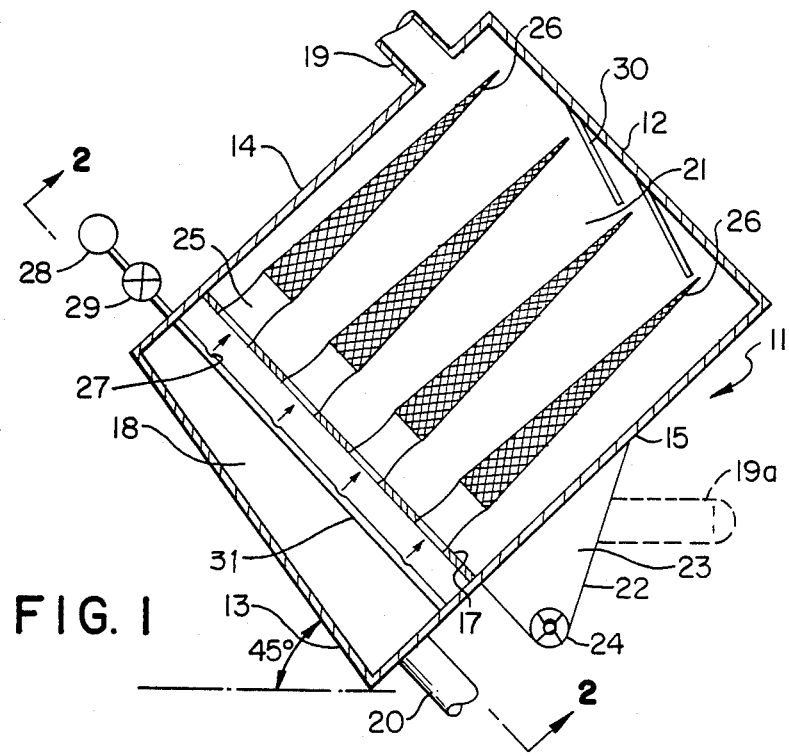
FIG. 1 shows a side view of the screening device of the invention.
Figure 2:
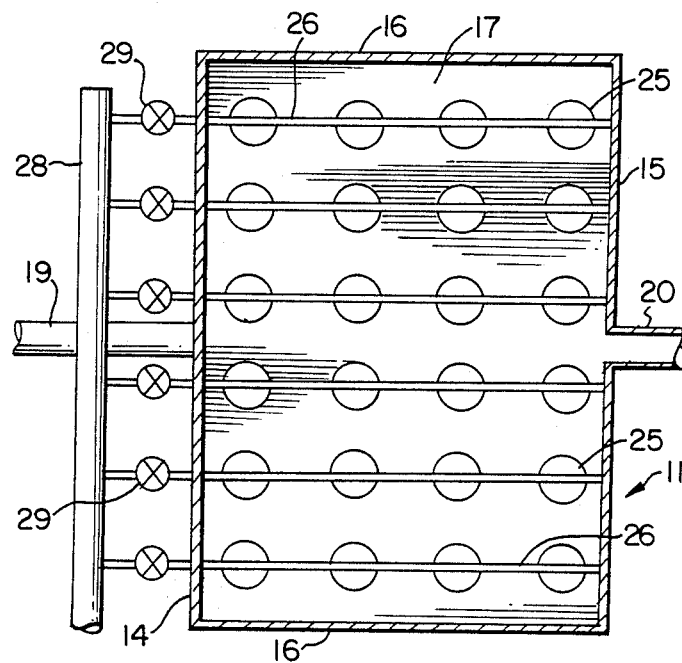
FIG. 2 is a sectional bottom view of the device through line 2—2 of FIG. 1.

Referring to FIGS. 1 and 2 there is shown a device 11 for removing fines from particulate material according to the invention. The device comprises a box-like housing having a top wall 12, bottom wall 13, front wall 14, rear wall 15 and side walls 16. The walls may be comprised of metal, plastic or the like. For purposes of illustration the walls shown in FIGS. 1 and 2 are comprised of transparent plexiglass. Front wall 14 is shorter than rear wall 15 and bottom wall 13 connecting walls 14 and 15 is consequently angled downwardly. It should be noted that the entire housing is tilted downwardly with respect to the horizontal at an angle of approximately 45° the reason for which will be explained below. A solid tubesheet 17 is located in the lower portion of the housing which is parallel to top wall 12. A fines outlet chamber 18 is formed between the tubesheet 17 and bottom wall 13 which increases in cross-sectional area from front wall 14 to rear wall 15 to facilitate fines removal. A pre-screen chamber 21 is formed between the tubesheet and top wall 12. Centrally located at the top of front wall 14 is inlet 19. Centrally located at the bottom of rear wall 15 is fines outlet 20 which communicates with fines outlet chamber 18.

A coarse outlet 22 is centrally mounted in rear wall 15 above fines outlet 20 which communicates with pre-screen chamber 21. The coarse outlet has chamber 23 for collection of coarse particles. The outlet 22 is equipped with a rotary valve 24 or other sealing device to prevent air flow and allow coarse particles to be removed from chamber 23. Located in rows on tubesheet 17 are Venturi tubes 25 on which are mounted elongated conical screen elements 26. The mesh size of each screen is sufficient to allow passage of fines therethrough while preventing passage of coarse particles. Below each row of Venturi tubes 25 in the fines outlet chamber 18 is a blowpipe 31 having a plurality of nozzles or holes 27 directed upwardly toward each Venturi tube. The blow pipe extends outside the housing and is connected to air supply manifold 28. The manifold is in turn connected to a source of compressed air (not shown). A compressed air valve 29 is located in each blowpipe between the manifold 28 and front wall 14. Baffles 30 are mounted in top wall 12 and extend downwardly into the pre-screen chamber 21 at a slight angle.

In operation of the separator a mixture of particulate material containing coarse and fine particles to be separated is combined with a stream of air or an inert gas and introduced through inlet 19 into the pre-screen chamber 21. Baffles 30 act to direct air and material to the conical screens. The air and material contact the conical screens 26 wherein the fine particles pass through and the coarse particles fall by gravity to coarse outlet 22. During operation coarse particles also accumulate on the screens. The fine particles and air pass through Venturi tubes 25, into the fines outlet chamber 18 and then out outlet 20 where they can be passed to a collector and fan which provides flow of air or gas. (not shown).

Manifold 28 is connected to a source of compressed air or gas and periodically each compressed air valve 29 is opened momentarily to emit a pulse of compressed air upwardly through nozzles 27 in blowpipe 31 into a row of Venturi tubes 25. As compressed air exits nozzles 27 it forms a jet pump in conjunction with Venturi tubes 25. The counter-current action of the air jet halts the flow of air and fines in the pre-screen chamber and momentarily reverses air flow. As air flows in a jet from the Venturi tubes through the screens into the prescreen chamber 21 it blows coarse particles off the screen elements and unclogs them aided by vibration from the shock of the air pulse. The coarse particles then fall to the coarse outlet 22 by gravity. After the compressed air valve is closed, air and particle flow is again caused to flow through inlet 19 and the unclogged screens allow additional fines to pass through.

Generally the jet pulse of air through each Venturi should take place for about 0.1 seconds for each compressed air valve in sequence. The total sequence time will ordinarily range from 30 seconds to several minutes depending on the tendency of the coarse particles in the material being screened to build up.

The downward tilt of the housing and tubesheet promotes the flow of coarse material towards the coarse outlet from both the topside of the screens and the tubesheet. The acute angle of tilt is shown as approximately 45° from the horizontal although the angle may vary in magnitude depending on the flow properties of the material. In a number of operations the housing and tubesheet may be aligned horizontally.

The present device also offers the advantage of increased active screen area over flat screens used as separators.

A normal flat screen occupying a floor area of 6'×6' would have a screen area of about 36 sq. ft. The present device can be contained in the same 6'×6' floor area having 49 screen elements each having approximately 4 sq. ft. of screen area. This would provide a total of 196 sq. ft. of screen area; over 5 times the active screen area of the flat screen.

FIG. 1 also shows an alternate embodiment of the present invention wherein the inlet for air and material is located at the bottom of rear wall 15 adjacent the coarse outlet 22 as shown by dotted lines 19'. Air and product introduced through inlet 19a would be forced upwardly against the conical screen elements in one pass. Coarse particles containing entrained fines would then be lifted up for multiple approaches to the screens, thereby effecting improved fines recovery.

It should also be pointed out that the conical screens may also be substituted by screens of cylindrical or frustroconical shape. A cylindrical cylinder 32 is shown in FIG. 3 mounted on a Venturi tube 25. The Venturi tubes 25 can be mounted above or below the tubesheet 17. This would apply to any construction of the device as shown in the drawings.

In addition, the active surface area of the conical screen may be increased by pleating the screen. FIGS. 4 and 5 show a pleated conical screen 26a mounted on a Venturi tube 25.

Figure 6:
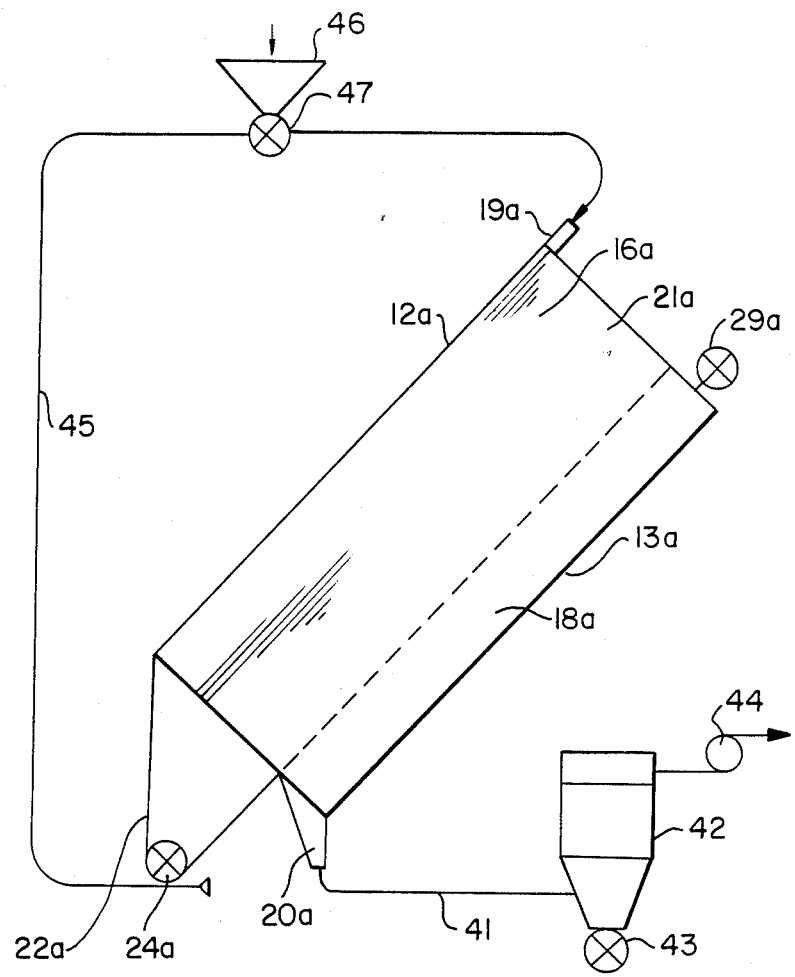
FIG. 6 shows an embodiment of the screening device used to obtain substantially complete fines removal.

FIG. 6 shows another embodiment of the invention wherein the device contains a recirculating loop so that substantially 100% of fines can be separated from the particulate material. Reference numerals in FIG. 6 similar to the elements of the device of FIGS. 1 and 2 are designated by the numeral already assigned plus the letter a.

The Figure shows a device similar to that shown in FIGS. 1 & 2 having top wall 12a, bottom wall 13a and side walls 16a. Tubesheet 17a separates the housing into a fines outlet chamber 18a and a pre-screen chamber 21a. A series of compressed air valves 29a (one shown) are connected to a blowpipe inside the fines outlet chamber. The fines are led from the fines outlet 20a through line 41 to collector 42 having discharge valve 43. Fan or blower 44 provides the flow of air or gas and particulate material through the system. The coarse outlet 22a has rotary valve 24a connected to duct 45 which makes a closed loop with the separator at inlet 19a. A hopper 46 having rotary discharge valve 47 is located anywhere along duct 45 for feeding particulate material to be separated into the separator batchwise or at a low rate to allow extended residence time in the separating device.

In use, a batch of material containing coarse and fine particles to be separated are introduced to hopper 46 and then to duct 45 by feeding through valve 47. Rotary discharge valve 47 is closed or run at reduced speed and separation takes place as discussed in connection with FIGS. 1 and 2 except that coarse particles containing entrained fines exit the coarse outlet 22a and re-enter duct 45 where they are re-introduced to inlet 19a for further separation of fines. The recirculation of fineentrained coarse particles is continued until substantially complete fines removal takes place. Fines are continuously withdrawn from outlet 20a and accumulate in collector 42 where they are later removed or continuously discharged by rotary valve 43.

Figure 7:
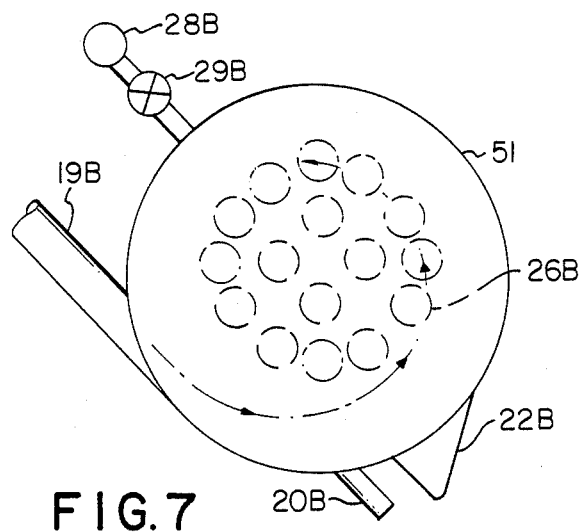
FIG. 7 is a top view of another embodiment of the screening device having a cylindrical shape.
Figure 8:
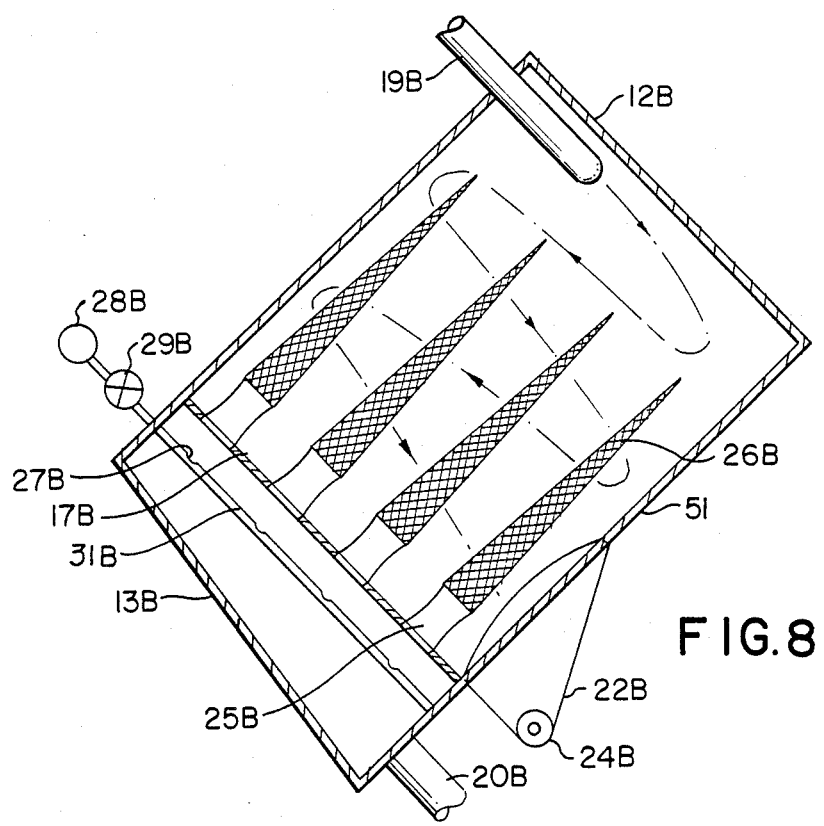
FIG. 8 is a side view of the device of FIG. 7.

FIGS. 7 and 8 show still another embodiment of the invention in which the housing is of cylindrical construction and the conical screen elements are arranged circularly therein. Like elements of the apparatus of FIGS. 1 and 2 in the apparatus of FIGS. 7 and 8 are designated by the same reference numeral plus the letter b.

In this embodiment top wall 12b and bottom wall 13b are circular and cylindrical side wall 51 constitutes the only outer wall of the housing. The tubesheet 17b is also circular and the conical screen elements 26b are arranged thereon. The blowpipe 31b and nozzles 27b are arranged to lie under the Venturi tubes 25b. The inlet 19b is mounted tangentially on the cylindrical side wall. As air and particulate material are introduced to the inlet 19b as a stream the flow is circularly and downwardly through the conical screen elements to enhance separation of fines by promoting inertial separation of coarse particles through centrifugal force, thus partially eliminating the load of coarse particles which would otherwise need more pulsing action to unclog the screens.

Figure 9:
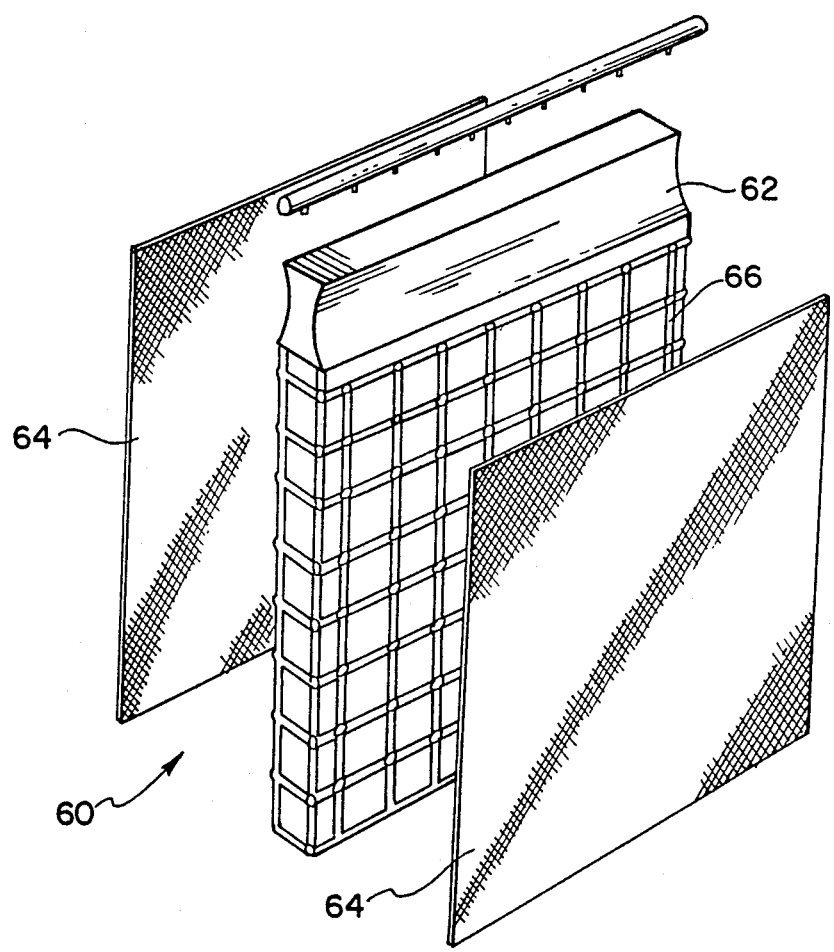
FIG. 9 is a perspective view of yet another embodiment of the invention.

In the further embodiment shown in FIG. 9, the overall screening element attached to Venturi 62 is substantially planar and rectangular in shape and includes support frame 66 carrying screens 64 on two or more sides of the rectangular member. Screen 64 can be permanently attached to support frame 60 or detachably mounted thereon for service and replacement.

I claim:

1. An apparatus for continuously separating a mixture of fine and coarse particles comprising:
   (a) a hollow housing having a tubesheet located therein tilted downwardly at an acute angle from the horizontal, said tubesheet separating said housing into a lower fines outlet chamber and an upper pre-screen chamber;
   (b) a plurality of Venturi tubes mounted on said tubesheet;
   (c) a plurality of screen elements mounted on said Venturi tubes;
   (d) means located in said fines outlet chamber for introducing a pulse of a compressed gas through said Venturi tubes to the screens;
   (e) an inlet for introducing air and said mixture of fine and coarse particles to said pre-screen chamber mounted in said housing;
   (f) an outlet for coarse particles mounted on said housing and communicating with said pre-screen chamber; and
   (g) an outlet for fine particles mounted in said housing and communicating with said fines outlet chamber.

2. The apparatus of claim 1 wherein said angle is about 45°.

3. The apparatus of claim 1 wherein said screen elements are conical screen elements.

4. The apparatus of claim 3 wherein said conical screen elements are pleated.

5. The apparatus of claim 1 wherein said screen elements are cylindrical.

6. The apparatus of claim 1 wherein said hollow housing is a box and said screen elements are arranged in rows therein.

7. The apparatus of claim 3 wherein said housing is cylindrical.

8. The apparatus of claim 7 wherein said inlet is mounted tangentially in the top portion of said housing.

9. The apparatus of claim 1 wherein said screen elements are planar and carried on more than one side of a rectangular member.

10. The apparatus of claim 1 wherein said inlet is mounted at the top of said housing.

11. The apparatus of claim 1 wherein said inlet is mounted at the bottom of said housing.

12. The apparatus of claim 1 which further comprises a recirculating duct extending from said outlet for coarse particles to said inlet.

13. The apparatus of claim 12 wherein a container for mixture of fine and coarse particles is connected with said recirculating duct.

14. The apparatus of claim 1 which further comprises a baffle in said housing for directing said mixture of fine and coarse particles to said screen elements.

15. An apparatus for continuously separating a mixture of fine and coarse particles comprising:
   (a) a hollow housing having a tubesheet located therein, said tubesheet separating said housing into a fines outlet chamber and a pre-screen chamber;
   (b) a plurality of Venturi tubes mounted on said tubesheet;
   (c) a plurality of screen elements mounted on said Venturi tubes;
   (d) means located in said fines outlet chamber for introducing a pulse of a compressed gas through said Venturi tubes to the screen elements;
   (e) an inlet for introducing air and said mixture of fine and coarse particles to said pre-screen chamber mounted in said housing;
   (f) an outlet for coarse particles mounted on said housing and communicating with said pre-screen chamber; and
   (g) an outlet for fine particles mounted in said housing and communicating with said fines outlet chamber.

16. The apparatus of claim 15 where the tubesheet is tilted at an acute angle from the horizontal.

17. The apparatus of claim 16 where the screen elements are at an angle to the horizontal.

18. The apparatus of claim 16 where the fines outlet chamber has a bottom wall at an angle to the horizontal and the prescreen chamber is above the tubesheet.

* * * * *